(12) United States Patent
Kosanke

(10) Patent No.: US 7,909,002 B2
(45) Date of Patent: Mar. 22, 2011

(54) AVIAN HUT

(75) Inventor: Tobi Kosanke, Hempstead, TX (US)

(73) Assignee: Crazy K Poultry & Livestock, LLC, Hempstead, TX (US)

(*) Notice: Subject to any disclaimer, the term of this patent is extended or adjusted under 35 U.S.C. 154(b) by 211 days.

(21) Appl. No.: 12/372,763

(22) Filed: Feb. 18, 2009

(65) Prior Publication Data

US 2010/0077965 A1   Apr. 1, 2010

Related U.S. Application Data

(60) Provisional application No. 61/100,523, filed on Sep. 26, 2008.

(51) Int. Cl.
*A01K 31/06* (2006.01)
*A01K 31/12* (2006.01)

(52) U.S. Cl. .......................... 119/468; 119/467

(58) Field of Classification Search .................. 119/468, 119/429, 431, 428, 531, 460, 469
See application file for complete search history.

(56) References Cited

U.S. PATENT DOCUMENTS

| | | | | | |
|---|---|---|---|---|---|
| 1,616,223 | A | * | 2/1927 | Hooey | 119/460 |
| 3,712,267 | A | * | 1/1973 | Moliterni | 119/464 |
| 4,235,196 | A | * | 11/1980 | Moliterni | 119/464 |
| 4,384,547 | A | * | 5/1983 | Mattox | 119/464 |
| 5,381,758 | A | * | 1/1995 | Simon | 119/537 |
| 5,924,380 | A | * | 7/1999 | Rayborn | 119/51.5 |
| 5,975,023 | A | * | 11/1999 | Schlick | 119/467 |
| 2005/0217597 | A1 | * | 10/2005 | Axelrod | 119/464 |

* cited by examiner

*Primary Examiner* — Timothy D Collins
*Assistant Examiner* — Monica Williams
(74) *Attorney, Agent, or Firm* — Mayback & Hoffman, P.A.; Gregory L. Mayback; Rebecca A. Tie

(57) ABSTRACT

An avian hut includes a plurality of walls, each wall having an upper edge and a lower edge and coupled to at least one other of the plurality of walls, the plurality of walls together defining an avian hut interior and an avian hut exterior, the lower edges together defining an opening open to the environment, and at least one of the plurality of walls defining a notch shaped to accept a perch secured to an interior of a bird enclosure thereby allowing the perch to extend from the exterior of the avian hut into the interior of the avian hut. A securing device is operable to removably secure the plurality of walls within a bird cage and the notch above the perch.

18 Claims, 7 Drawing Sheets

AVIAN HUT

CROSS-REFERENCE TO RELATED APPLICATION

This application claims the priority, under 35 U.S.C. §119, of U.S. Provisional Patent Application Ser. No. 61/100,523 filed Sep. 26, 2008, the entire disclosure of which is hereby incorporated herein by reference in its entireties.

FIELD OF THE INVENTION

The present invention relates generally to shelter for birds and, more particularly, to a hut with an open bottom that attaches within an interior of a bird cage and hangs directly over a pre-existing bird perch within and attached to the bird cage.

BACKGROUND OF THE INVENTION

Parrots and other caged birds require approximately 12 hours of undisturbed sleep each night. The natural resting and sleeping position of a bird is perching, i.e., standing on a perch. Birds are uniquely able to sleep while standing on a perch, due to the fact that their feet naturally contract to grasp and hold onto the perch when the sleep, allowing them to remain upright.

Most parrots and other caged birds either enjoy or emotionally require a semi-enclosed space for retreat within its cage where it can feel safe and secure. Covering a cage with a towel or sheet at night is a common practice for many bird owners. The covered cage causes the bird to feel secure; however, this practice takes effort and discipline to remove it at the proper time each morning and is also unsightly to have a hanging towel or sheet in one's house. Several bird huts have been designed that provide a private space for a bird to obtain undisturbed sleep and to rest in within its cage.

However, none of the other known bird huts are designed to provide a caged bird with a sleeping/resting area that enables the bird to sleep or rest in a natural position. Specifically, it is unnatural for a bird to sleep with extended toes on a flat base, which is found in the prior art. Flat-based huts have been criticized for causing injuries and deaths to the birds that use them. Birds using these types of huts have been known to catch their toe nails in the floor of the hut, which has resulted in documented cases of toe and foot injury, toe loss, and even death.

An alternative solution, which provides a three-sided tent that lacks a base, has no roof and lacks the space to accommodate larger birds such as Macaws.

In addition, parrots and other caged birds emotionally and mentally benefit from having a substance in their cage against which they can snuggle before or while sleeping. Some substances provide birds with this benefit, but lack the ability to also provide the bird with privacy.

Therefore, a need exists to overcome the problems with the prior art as discussed above.

SUMMARY OF THE INVENTION

The invention provides an avian hut that overcomes the hereinafore-mentioned disadvantages of the heretofore-known devices of this general type and that provides a secluded area within a standard bird's cage without the need for modification of the cage.

With the foregoing and other objects in view, there is provided, in accordance with the invention, an avian hut having a plurality of walls, each wall having an upper edge and a lower edge and coupled to at least one other of the plurality of walls, the plurality of walls together defining an avian hut interior and an avian hut exterior, the lower edges together defining an opening open to the environment, and at least one of the plurality of walls defining a notch shaped to accept a perch secured to an interior of a bird enclosure thereby allowing the perch to extend from the exterior of the avian hut into the interior of the avian hut. A securing device is operable to removably secure the plurality of walls within a bird cage and the notch above the perch.

With the objects of the invention in view, there is also provided a roof coupled to the upper edges of at least two of the walls.

In accordance with another feature of the invention, one of walls has an opening sized to permit a bird to pass there through.

In accordance with a further feature of the invention, one of the plurality of walls has an exterior surface, an interior surface, and a soft material provided on the interior surface.

In accordance with an additional feature of the invention, there is provided at least two straps coupled to the roof.

In accordance with yet another feature of the invention, there is provided a window within at least one of the walls.

In accordance with yet a further feature of the invention, the window can be either an opening or a graphical representation of a window.

In accordance with a concomitant feature of the invention, in combination with a bird enclosure having a top, a set of enclosure walls, and a perch attached at one end thereof to a first of the enclosure walls and extending inward to an interior of the enclosure, the improvement includes a sub-enclosure within the bird enclosure, where the sub-enclosure has a plurality of walls, each wall having an upper edge and a lower edge and coupled to at least one other of the plurality of walls, the plurality of walls together defining an interior of the sub-enclosure and an exterior of the sub-enclosure, the lower edges together defining an opening open to the environment, and at least one of the plurality of walls defining a notch shaped to accept the perch thereby allowing the perch to extend from the exterior of the sub-enclosure into the interior of the sub-enclosure and at least one securing device for securing the sub-enclosure within the bird enclosure so that a portion of the notch is positioned above the perch.

In accordance with yet an added feature of the invention, there is provided an avian hut having a set of walls defining an avian hut interior and defining an avian hut exterior. at least one wall of the set of walls defines an entrance opening and at least one wall of the set of walls defines a perch notch along a lower edge thereof. The avian hut also includes a roof coupled to an upper edge of at least one wall of the set of walls and at least one securing element coupled to the avian hut and operable to fixedly secure the avian hut within an interior of a bird cage in a location above a perch.

In accordance with yet an additional feature of the invention, an avian hut has a front wall with an opening, a first side wall coupled to the front wall, a second side wall coupled to the front wall and opposite the first side wall, a back wall having an upper edge and a lower edge and defining a perch notch within the lower edge, the back wall coupled to the first side wall and to the second side wall, and a roof coupled to the front wall, the first side wall, the second side wall, and the back wall, wherein the back wall, the front wall, the first side wall, and the second side wall define an avian hut interior, an avian hut exterior, and an opening within a lower portion thereof and whereby the perch notch is sized to at least partially surround a portion of a perch provided within an interior of a bird cage and attached to a wall of the bird cage.

Although the invention is illustrated and described herein as embodied in an avian hut, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to further illustrate various embodiments and to explain various principles and advantages all in accordance with the present invention.

DETAILED DESCRIPTION

Herein various embodiment of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 1:
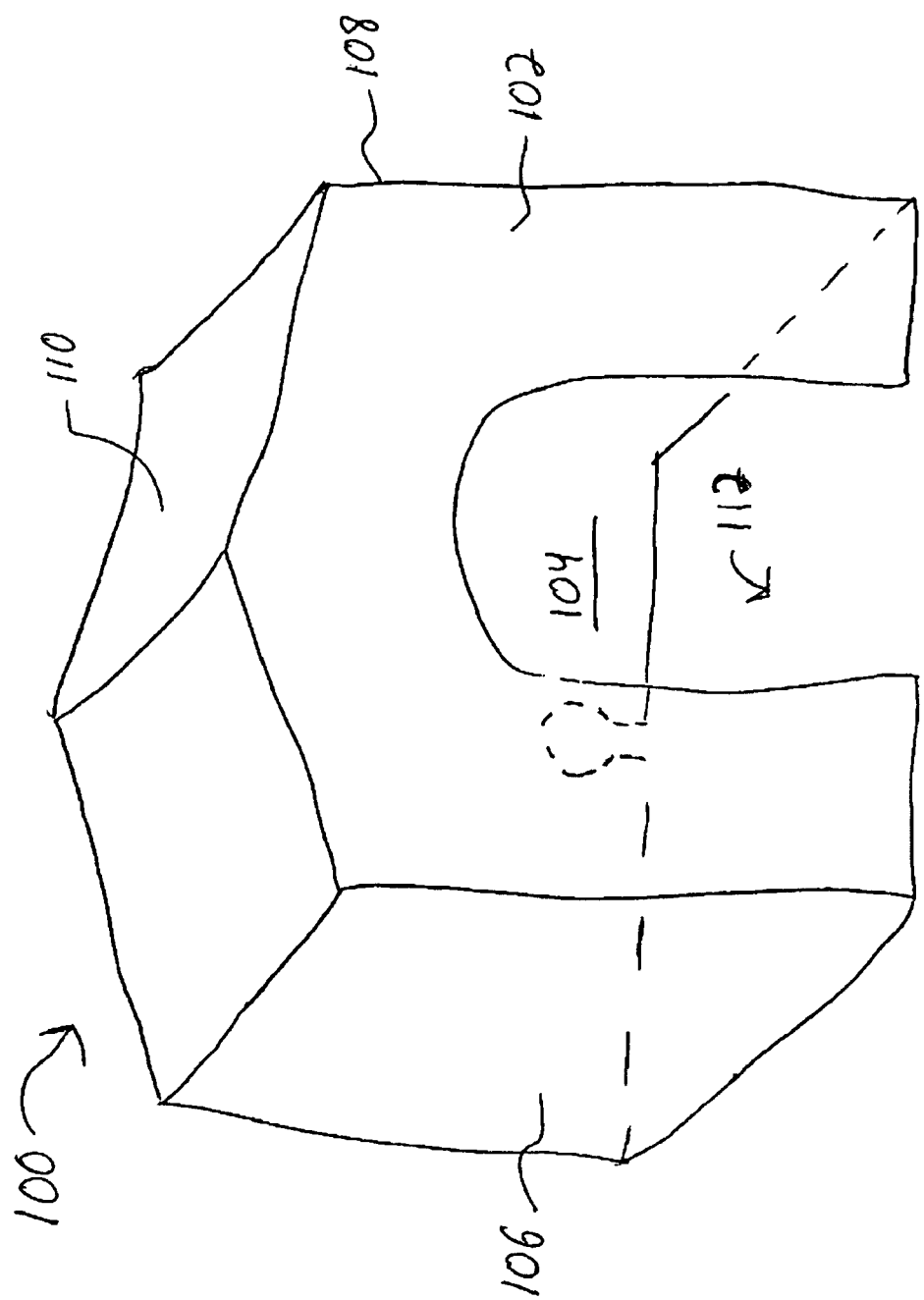
FIG. 1 is a perspective and partially hidden view of an avian hut having a doorway, slotted entry portion for acceptance of a perch, and a nestling wall, according to an embodiment of the present invention.

Referring now to FIG. 1, one exemplary embodiment of the present invention is shown. FIG. 1 illustrates an avian hut 100 that includes a front wall 102, a rear wall 104, a left side wall 106, a right side wall 108, and a roof 110. The inventive hut 100 is advantageous as it is suitable for easy installation within a bird cage and positioned directly over the pre-existing perch. The avian hut 100, when installed within the cage as a sub-enclosure of the cage, enables the bird to sleep on the pre-existing perch in its natural perching position. In addition, the open bottom allows for sanitary removal of any droppings.

Figure 2:
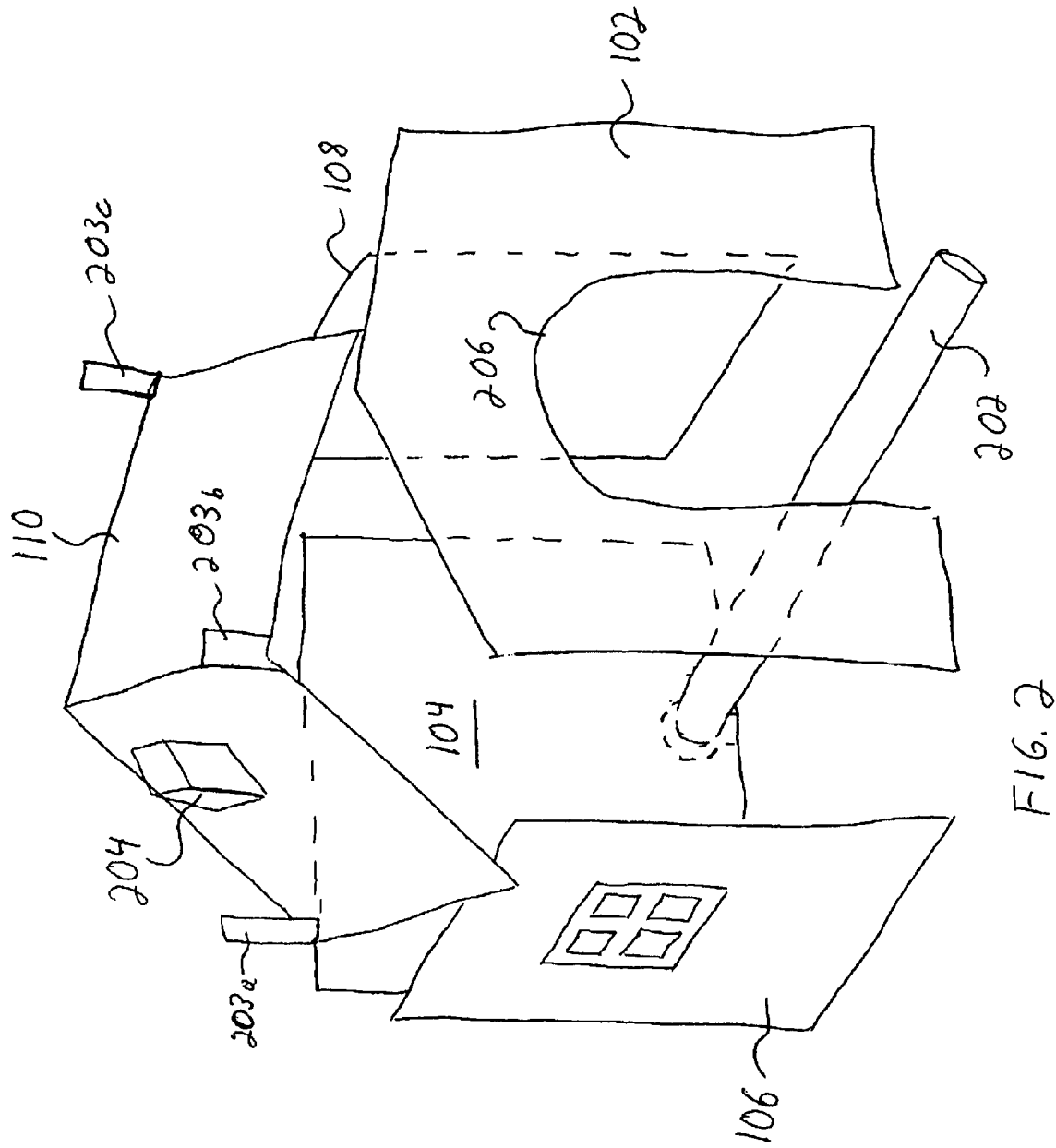
FIG. 2 is a perspective exploded and partially hidden view of the avian hut of FIG. 1.

Each of the elements 102-110 of FIG. 1 and their interrelation are shown in the exploded view of FIG. 2. FIG. 2 also shows the hut in its intended orientation above a perch 202 that typically has an end attached to a wall of the cage and its second end extending toward a central area within the cage (which may or may not extend all the way to the other side of the cage). In this embodiment shown, the perch 202 extends through the rear wall 104, through the interior of the hut, and through an opening 206 in the front wall 102. A bird is able to enter the hut 100 by walking along the perch 202 and through the opening 206 of the front wall 102.

Figure 3:
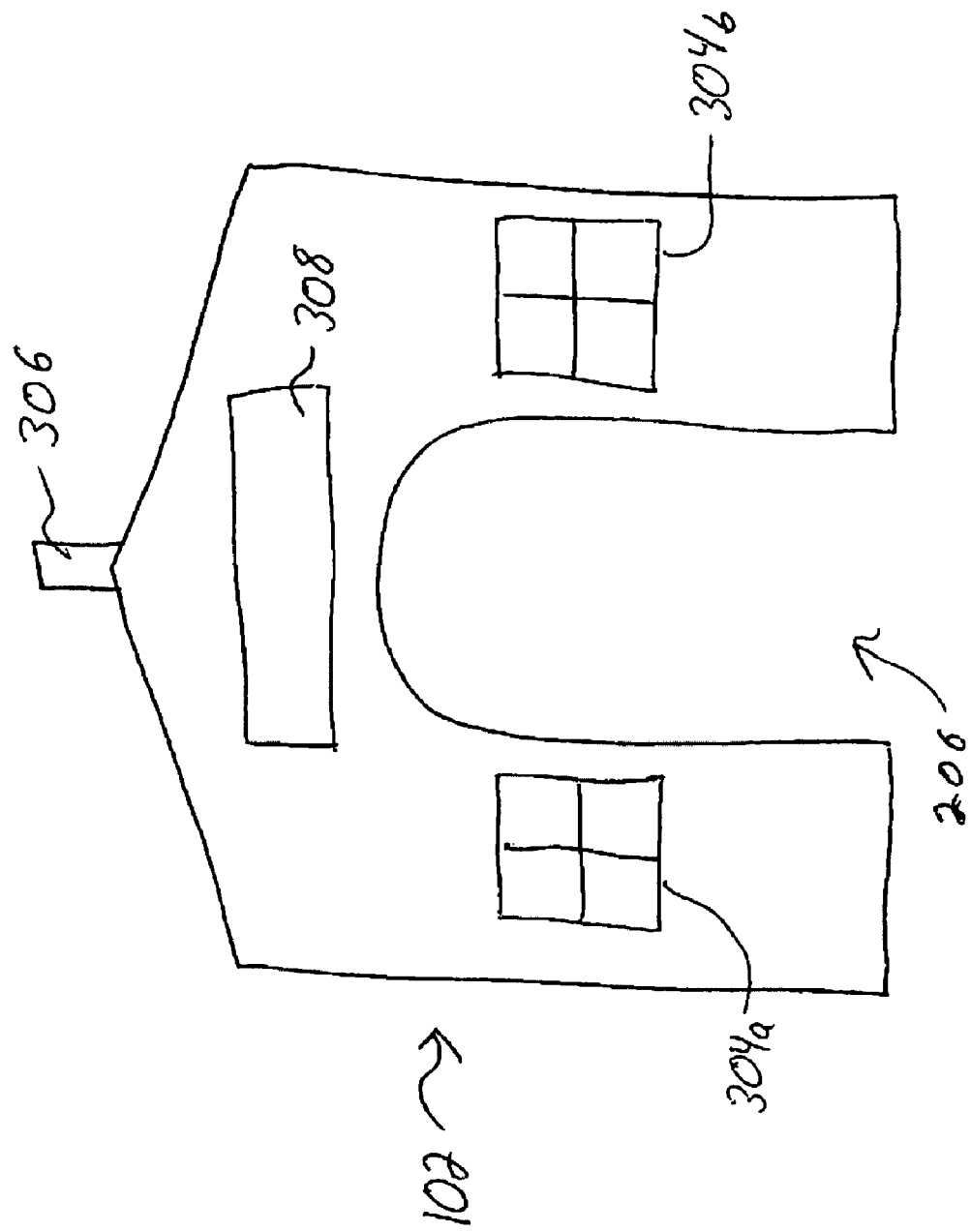
FIG. 3 is an elevational exterior view of the front wall of the avian hut of FIG. 1.

Discussing each element in order, the front wall 102, shown isolated in FIG. 3, features the opening 206 where the bird can enter and exit the hut 100. The opening 206 is in no way limited to the shape or proportional size shown in FIG. 3. The size and shape of the opening can be selected based on the type of bird using the inventive hut 100. FIG. 3 also shows optional window features 304a, 304b. The windows 304a, 304b are provided to enhance the look of the hut 100 and imitate the appearance of an actual house. The windows 304a, 304b can also serve a functional purpose, such as to allow air and light to pass in or out of the hut 100 and allow the bird to see in or out through the windows 304a, 304b. The embodiments of the windows 304a, 304b can vary from being an opening that allows air and light to pass from outside the hut 100 to within the hut 100, to including actual glass or other transparent material, or being simply a graphical representation of a window, or being a combination thereof.

In addition, FIG. 3 shows an optional sign 308 which, in this particular embodiment shown, is located directly above the opening 206. The sign 308 can read, for instance, "Home Sweet Home," "Welcome," "Polly's Place," or any other to provide a decorative improvement to the hut 100. Many other features can be added and the present invention is in no way limited to those shown here.

FIG. 3 also shows a strap 306 that can be used to secure the inventive hut 100 to an upper portion of the cage in which the inventive hut 100 is installed. The strap 306 can include, for instance, VELCRO®, snaps, ribbons, hook and loop, metal rings, strings, belts, and many others that secure an object to a structure. Alternatively, the strap 306 can be attached to the roof 110 only (which is shown, for example, with straps 203a and 203b in FIG. 2). The term "strap," as used herein, is intended to indicate any securing mechanism or device that physically couples elements of the hut 100 to a bird cage.

Figure 4:
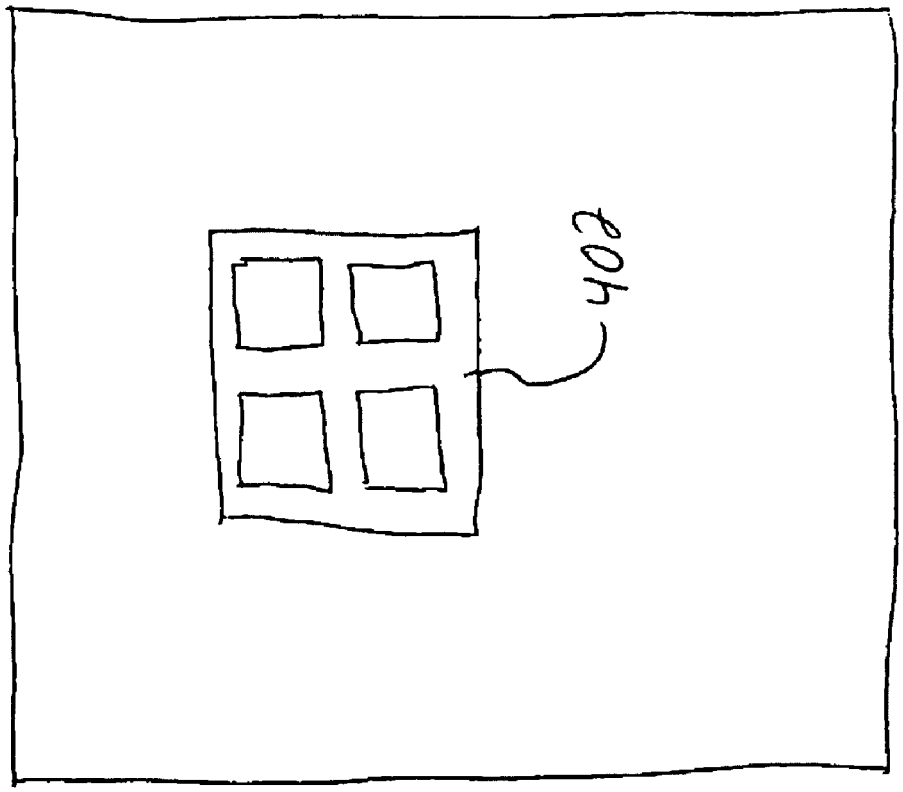
FIG. 4 is an elevational exterior view of the side wall of the avian hut of FIG. 1.

Referring now to FIG. 4, the left side wall 106 is shown. It should be noted that there is not necessarily any difference between the left 106 and right 108 side walls and the left side wall 106 shown in FIG. 4 may be an accurate representation of the right side wall 108. For this reason, only the left side wall 106 is shown individual in the figures of the instant application.

The left side wall 106, in conjunction with the roof 110 and the right side wall 108, couples the front wall 102 to the rear wall 104 and provides a level of isolation between the exterior of the hut 100 and the interior of the hut 100. For maximum isolation, the left side wall 106 can be solid and prevent any light from penetrating from outside the hut 100 to inside the hut 100. As with the front wall 102 described directly above, the left side wall 106 can be provided with decorative or functional features as well. For instance, and as shown in the particular embodiment illustrated in FIG. 4, the left side wall 106 can be provided with a window feature 402. The window(s) 402 is provided to enhance the look of the hut 100 and imitate the appearance of an actual house, but can also serve a functional purpose, such as to allow air and/or light to pass in or out of the hut 100. The embodiments of the window 402 can vary from including actual glass or other transparent material, being an opening that allows air to pass from outside the hut 100 to within the hut 100, being simply a graphical representation of a window, or being a combination thereof.

Figure 5:
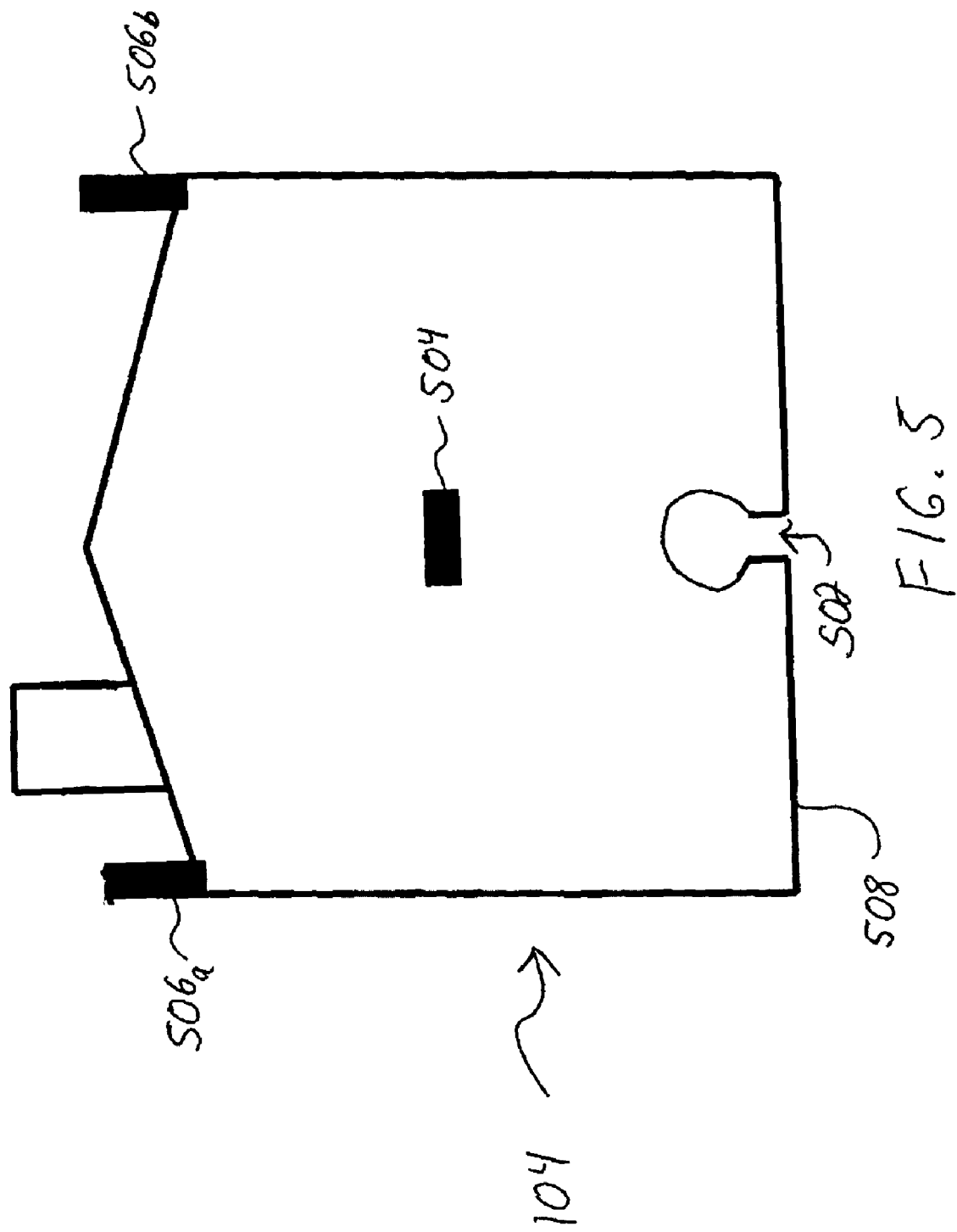
FIG. 5 is an elevational exterior view of the rear wall of the avian hut of FIG. 1.

Looking now to FIG. 5, an exterior surface of the rear wall 104 is show isolated from the other elements of the hut 100. The rear wall 104, in conjunction with the roof 110 and the front wall 102, couples the left 106 and right 108 side walls to each other. As with the front wall 102 and the side walls 106, 108, the rear wall 104 can have decorative features. However, since the rear wall 104 is less visible typically, no decorative features are shown in the exemplary embodiment illustrated in FIG. 5. The absence of such features is not intended to limit the rear wall 104 in any way.

The rear wall 104 is provided with a notch area 502 in a lower edge 508 thereof that at least partially surrounds and allows a preexisting perch 202 (shown in FIG. 2 only) to extend within the hut 100. The notch 502 can be any shape and generally accepts the perch 202 so that the hut 100 is secured, to some degree, on either side of the perch 202. The notch allows the lower edges of the walls 102-108 of the hut 100 to extend below the perch 202.

The rear wall 104 can also include a strap or other attachment device 504 that can be used to attach the hut 100 to the structure, i.e., wall, of the cage in which the inventive hut 100 is installed. FIG. 5 also shows a pair of upper straps 506a, 506b that can be used to secure the inventive hut 100 to an upper portion of the cage in which the inventive hut 100 is installed. The straps 504, 506a, 506b can be, for instance VELCRO®, snaps, ribbons, hook and loop, metal rings, strings, belts, hooks and many others that secure an object to a structure. Alternatively, the straps 506a, 506b can be attached to the roof 110 only, as is the embodiment shown in the FIG. 2.

Figure 6:
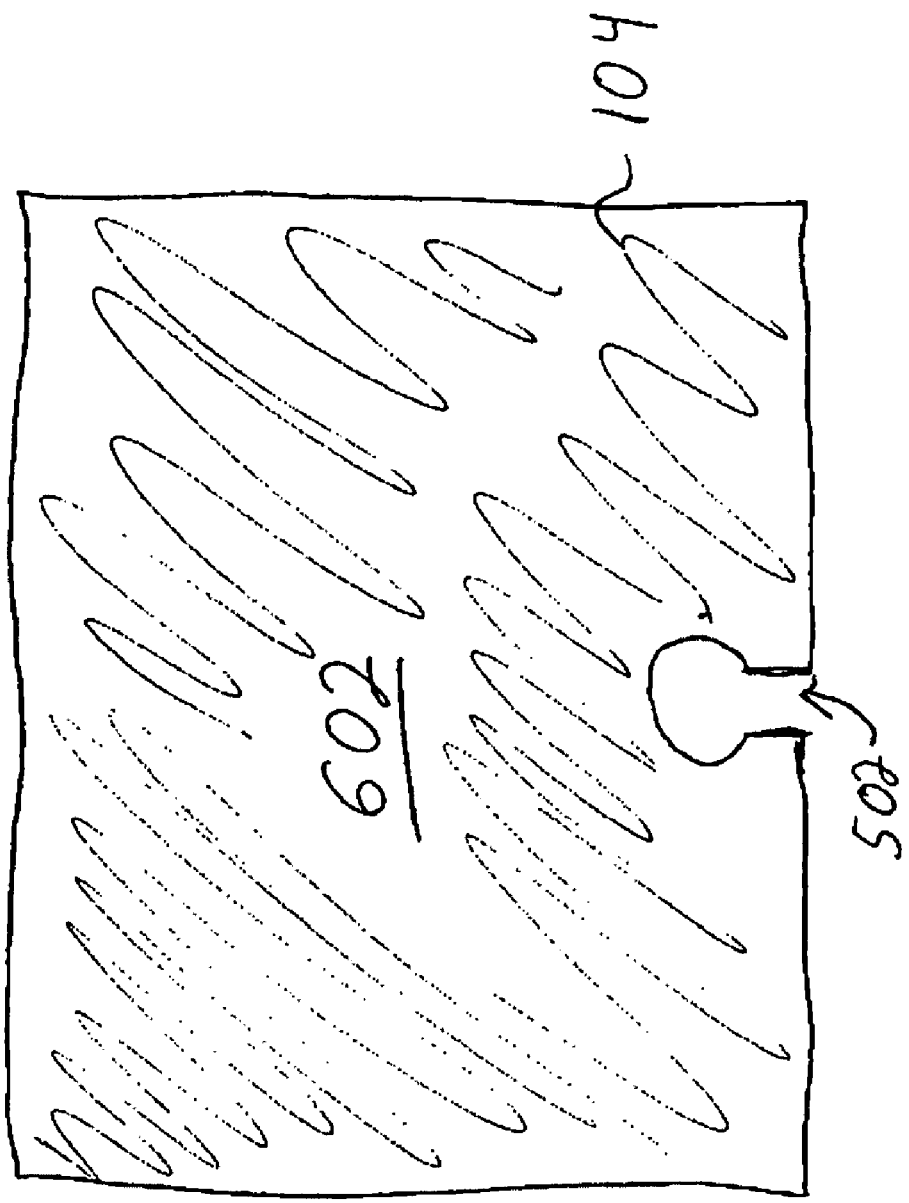
FIG. 6 is an elevational interior view of the rear wall of the avian hut of FIG. 1.

Referring now to FIG. 6, an interior surface of the rear wall 104 is shown. The interior of the rear wall 104, according to an embodiment of the present invention, is provided with a soft material 602. As used herein, the term "soft" is intended to mean a substance with a property similar to, for instance, wool, faux wool, felt or other similar plush materials. The soft material 602 allows the bird to nestle against it and is likely to make the bird feel comfortable and safe while inside the hut 100.

The nestling wall 602 can be sewn into the hut with thread, glued, held by hook and loop, taped, or any other method of attachment. In some embodiments, the rear wall 104 is made only of the nestling material 602.

Looking back now to FIG. 2, the roof 110 is shown separated from the front 102, back 104, left 106, and right 108 walls. The roof 110, when attached, couples the front 102, back 104, left 106, and right 108 walls to each other. The roof 110 also, in this particular embodiment, has the three straps 203a-c attached, which can be used to secure the inventive hut 100 to an upper portion of the cage in which the inventive hut 100 is installed. The roof 110, as shown in FIG. 2, also features a decorative chimney 204. The chimney 204 further provides the appearance of an actual house.

Figure 7:
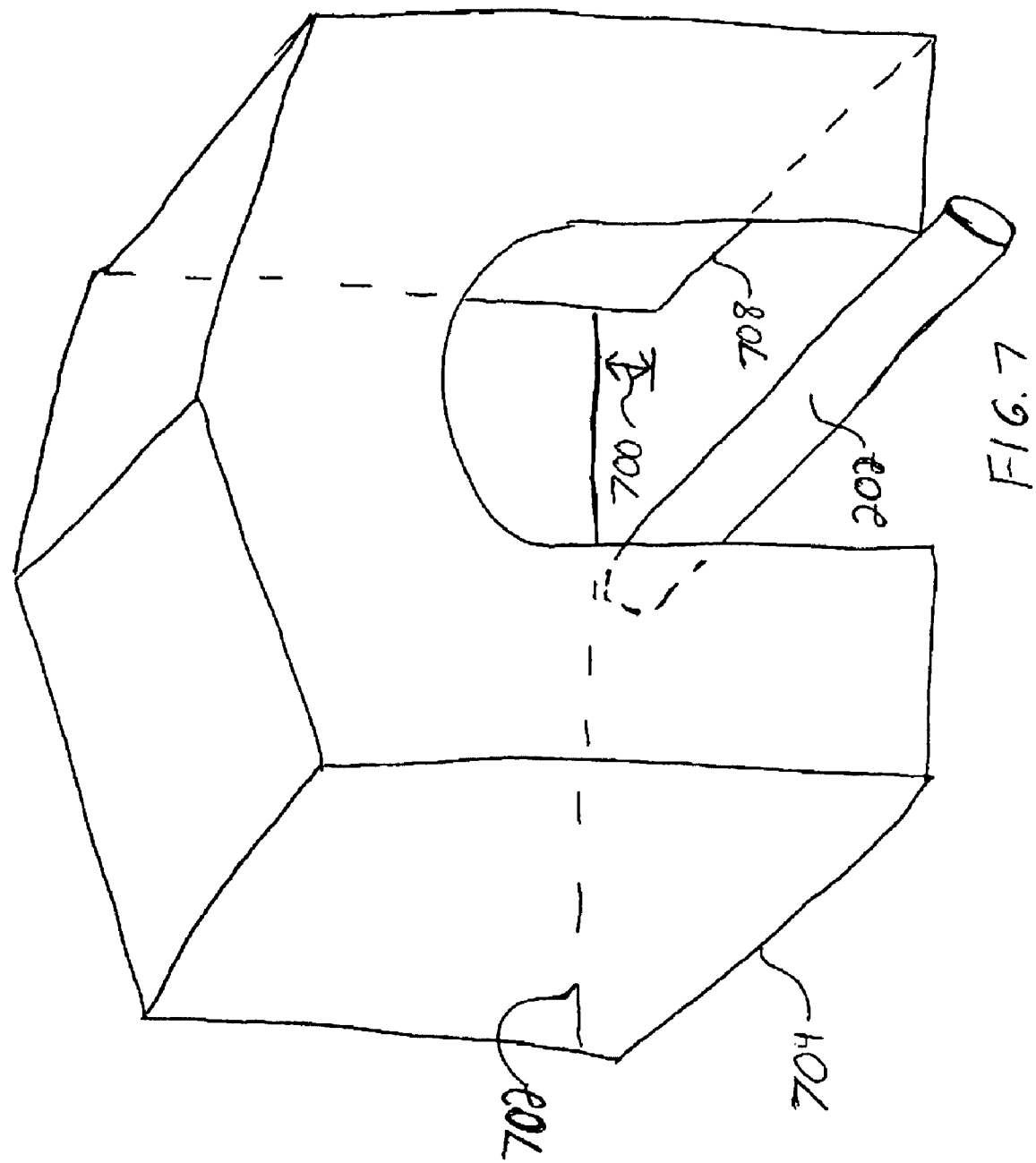
FIG. 7 is a perspective and partially hidden view of the avian hut of FIG. 1 with the entire lower edge of the back wall defining a notch.

In yet another embodiment, shown in FIG. 7, a lower edge 702 of the back wall 104 does not extend as far as the lower edges 704 and 106 of the adjacent side walls 106 and 108, respectively. In this embodiment, the entire lower edge 702 defines the notch 700, where the perch 202 is able to extend into the hut 100.

Advantageously, as shown in FIG. 1, the four walls 102-108 define an opening 112 at a lower portion of the hut 100. The opening can be the entire space between the walls 102-108 or a smaller area than the entire portion. The opening 112 allows larger birds, known for having long extending tail feathers, to enjoy privacy within the hut 100. Once inside, the feathers can easily and comfortably extend beyond the lower edges of the walls 102-108, a feature not present in some traditional houses with floors.

It should further be noted that the above-described elements of the present invention can be constructed of a variety of materials, such as, but not limited to, felt, cotton, denim, canvas duck, leather, nylon, and many others.

An avian hut has been disclosed that features a generally open bottom with a notch in at least one wall that fits over and at least partially surrounds a perch within a bird's cage. The hut advantageously provides a private area within the bird's cage for the bird to hide, sleep, and rest while perching in a natural position. The hut, according to particular embodiments of the present invention, has four side walls, a roof, a doorway and details reflective of a human residence. The inner side of the back wall of the hut, according to an embodiment, is made of thick, plush material that provides the bird with a soft, fuzzy wall to nestle and relax against.

What is claimed is:
1. An avian hut within a bird cage comprising:
a plurality of walls, each wall having an upper edge and a lower edge and coupled to at least one other of the plurality of walls, the plurality of walls together defining an avian hut interior and an avian hut exterior, the lower edges together defining an opening open to the environment, and at least one of the plurality of walls defining a notch shaped to accept a perch secured to an interior of a bird enclosure thereby allowing the perch to extend from the exterior of the avian hut into the interior of the avian hut; and a securing device removably securing: the plurality of walls within the bird cage; and
the notch above the perch.

2. The avian hut within a bird cage according to claim 1, further comprising:
a first wall of the plurality of walls having an opening sized to permit a bird to pass there through.

3. The avian hut within a bird cage according to claim 1, further comprising:
at least one of the plurality of walls having:
an exterior surface;
an interior surface; and
a soft material provided on the interior surface.

4. The avian hut within a bird cage according to claim 1, further comprising:
a roof coupled to the upper edges of at least two of the plurality of walls.

5. The avian hut within a bird cage according to claim 4, wherein the securing device includes:
at least two straps coupled to the roof.

6. The avian hut within a bird cage according to claim 1, further comprising:
a window within at least one of the plurality of walls.

7. The avian hut within a bird cage according to claim 6, wherein:
the window is one of an opening and a graphical representation of a window.

8. An avian hut within a bird cage comprising:
a set of walls:
defining an avian hut interior;
defining an avian hut exterior;
having at least one wall of the set of walls defining an entrance opening; and
having at least one wall of the set of walls defining a perch notch along a lower edge thereof;
a roof coupled to an upper edge of at least one wall of the set of walls; and
at least one securing element coupled to the avian hut and fixedly securing the avian hut within an interior of the bird cage a location above a perch.

9. The avian hut within a bird cage according to claim 8, further comprising:
at least one wall of the set of walls having:
an exterior surface;
an interior surface; and
a soft material provided on the interior surface.

10. The avian hut within a bird cage according to claim 9, wherein:
the at least one wall of the set of walls having the soft material provided on the interior surface and the at least one wall of the set of walls defining a perch notch along a lower edge thereof is the same wall.

11. The avian hut within a bird cage according to claim 8, wherein the at least one securing element includes:
at least two securing straps coupled to the roof.

12. The avian hut within a bird cage according to claim 8, further comprising:
a window within at least one wall of the set of walls.

13. The avian hut within a bird cage according to claim 12, wherein:
the window is one of an opening and a graphical representation of a window.

14. The avian hut within a bird cage according to claim 8, wherein:
the perch notch is a shape formed into the at least one wall of the set of walls defining the perch notch.

15. The avian hut within a bird cage according to claim 8, wherein:
the perch notch is a bottom edge of the at least one wall of the set of walls defining the perch notch.

16. In combination with a bird enclosure having a top, a set of enclosure walls, and a perch attached at one end thereof to a first of the enclosure walls and extending inward to an interior of the enclosure, the improvement comprising:
a sub-enclosure within the bird enclosure, the sub-enclosure having:
a plurality of walls, each wall having an upper edge and a lower edge and coupled to at least one other of the plurality of walls, the plurality of walls together defining an interior of the sub-enclosure and an exterior of the sub-enclosure, the lower edges together defining an opening open to the environment, and at least one of the plurality of walls defining a notch shaped to accept the perch thereby allowing the perch to extend from the exterior of the sub-enclosure into the interior of the sub-enclosure; and
at least one securing device for securing the sub-enclosure within the bird enclosure so that a portion of the notch is positioned above the perch.

17. The avian hut according to claim 16, further comprising:
one of the plurality of walls having:
an exterior surface;
an interior surface; and
a soft material provided on the interior surface.

18. The avian hut according to claim 16, further comprising:
a window within at least one Wall of the set of walls where the window is one of an opening and a graphical representation of a window.

* * * * *